(12) United States Patent
Sin

(10) Patent No.: US 9,555,827 B2
(45) Date of Patent: Jan. 31, 2017

(54) MOTOR AND ELECTRIC POWER STEERING APPARATUS INCLUDING THE SAME

(71) Applicant: MANDO CORPORATION, Pyeongtaek-si, Gyeonggi-do (KR)

(72) Inventor: Jun Ho Sin, Wonju-si (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/615,222

(22) Filed: Feb. 5, 2015

(65) Prior Publication Data

US 2015/0217797 A1    Aug. 6, 2015

(30) Foreign Application Priority Data

Feb. 6, 2014 (KR) .................. 10-2014-0013566

(51) Int. Cl.
*B62D 5/04* (2006.01)
*F16H 55/36* (2006.01)
*H02K 5/10* (2006.01)

(52) U.S. Cl.
CPC .......... *B62D 5/0403* (2013.01); *B62D 5/0424* (2013.01); *B62D 5/0445* (2013.01); *F16H 55/36* (2013.01); *H02K 5/10* (2013.01); *F16H 2055/363* (2013.01)

(58) Field of Classification Search
CPC .............................. B62D 5/0409; B62D 5/043
USPC .................................................. 180/443, 444
See application file for complete search history.

(56) References Cited

U.S. PATENT DOCUMENTS

| | | | |
|---|---|---|---|
| 5,082,299 A * | 1/1992 | Beattie ........................ | 279/133 |
| 6,390,230 B1 * | 5/2002 | Shimizu et al. .............. | 180/444 |
| 6,527,642 B1 * | 3/2003 | Arai et al. .................... | 464/104 |
| 2001/0035310 A1 * | 11/2001 | Tsuboi et al. ................ | 180/444 |
| 2003/0188918 A1 * | 10/2003 | Shimizu et al. .............. | 180/444 |
| 2007/0257447 A1 * | 11/2007 | Petrak .......................... | 277/551 |
| 2013/0153327 A1 * | 6/2013 | Walz et al. ................... | 180/443 |
| 2013/0270032 A1 * | 10/2013 | Tanaka ......................... | 180/444 |

* cited by examiner

*Primary Examiner* — Jacob Knutson
(74) *Attorney, Agent, or Firm* — McDermott Will & Emery LLP

(57) ABSTRACT

The present invention relates to an electric motor and an electric power steering apparatus including the same. According to an embodiment of the present invention, problems such as a malfunction of an electric motor, damage to a component of the electric motor, and lowering of an output of the electric motor can be solved by preventing penetration of foreign substances into the electric motor, so that a steering stability of a vehicle can be improved.

8 Claims, 4 Drawing Sheets

MOTOR AND ELECTRIC POWER STEERING APPARATUS INCLUDING THE SAME

CROSS-REFERENCE TO RELATED APPLICATION

This application claims priority from and the benefit under 35 U.S.C. §119(a) of Korean Patent Application No. 10-2014-0013566, filed on Feb. 6, 2014, which is hereby incorporated by reference for all purposes as if fully set forth herein.

BACKGROUND OF THE INVENTION

1. Field of the Invention

The present invention relates to an electric motor and an electric power steering apparatus including the same, and more particularly to an electric motor and an electric power steering apparatus including the same, by which problems such as a malfunction of an electric motor, damage to a component of the electric motor, and lowering of an output of the electric motor can be solved by preventing penetration of foreign substances into the electric motor, so that a steering stability of a vehicle can be improved.

2. Description of the Prior Art

FIG. 1 is a schematic diagram of a rack-driven power steering apparatus according to the related art.

As illustrated in FIG. 1, the rack-driven power steering apparatus, according to the related art, includes a driving unit 120 controlled by an electronic control unit (ECU) configured to determine a steering degree of a steering wheel 113 through a torque sensor 111 mounted to an upper end of a steering column 110, for generating power, a rack bar 130 for moving tie rods 133 connected to wheels 131 according to the steering degree of the steering wheel 113, and a driven unit 140 for receiving a rotational force of the driving unit 120, and converting the received rotational force into an axial movement force to transmit the axial movement force to the rack bar 130.

Here, the driving unit 120 includes an electric motor 121 controlled by the electronic control unit (ECU), a driving pulley 125 coupled to a shaft 123 of the electric motor 121, and a driving belt 127 wound on the driving pulley 125, and the driven unit 140 include a ball nut 141 for supporting the rack bar 130 inside a rack housing surrounding the rack bar 130, and a driven pulley 143 assembled on an outer peripheral surface of the ball nut 141.

The driven pulley 143 coupled to the driving pulley 125 connected to the shaft 123 of the electric motor 121 and the driven pulley 143 coupled to the ball nut 141 are disposed in parallel, and the driving belt 127 is mounted on the driving pulley 125 and the driven pulley 143 to transmit the rotational force of the electric motor 121 to the rack bar 130. The rack bar 130 is moved leftwards and rightwards by an operation of the ball nut 141 to generate an assistant force.

However, in the rack-driven power steering apparatus according to the related art, foreign substances are introduced between the housing and the shaft of the electric motor which causes electric motor malfunction, damage to a component of the electric motor, and lowers the output of the electric motor, and accordingly, the steering stability of a vehicle cannot be secured.

SUMMARY OF THE INVENTION

An aspect of the present invention is to provide an electric motor and an electric power steering apparatus including the same, in which problems such as malfunction of an electric motor, damage to a component of the electric motor, and lowering of an output of the electric motor can be solved by preventing penetration of foreign substances into the electric motor so that the steering stability of a vehicle can be improved.

The aspect of the present invention is not limited thereto, and other unmentioned aspects of the present invention may be clearly appreciated by those skilled in the art from the following descriptions.

In accordance with an aspect of the present invention, there is provided an electric motor including: a flange coupled to a housing and having a hole, through which a driving shaft passes; and a sealing member of which an outer peripheral surface is attached to and supported by the hole and through which a driving shaft passes, such that a space between the driving shaft and the hole is blocked.

In accordance with another aspect of the present invention, there is provided an electric power steering apparatus including: the electric motor; and a pulley coupled to the driving shaft and having protrusion supports protruding to the radially outer sides at opposite ends thereof to support opposite ends of the driving belt.

According to exemplary embodiments of the present invention, problems such as a malfunction of an electric motor, damage to a component of the electric motor, and lowering of an output of the electric motor can be solved by preventing penetration of foreign substances into the electric motor, so that the steering stability of a vehicle can be improved.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, some embodiments of the present invention will be described in detail with reference to the exemplary drawings. In the following description, it should be appreciated that when one component is described as being "connected," "coupled" or "joined" to another component, a third component may be "connected," "coupled," and "joined" between the first and second components, although the first component may be directly connected, coupled or joined to the second component.

Figure 1:
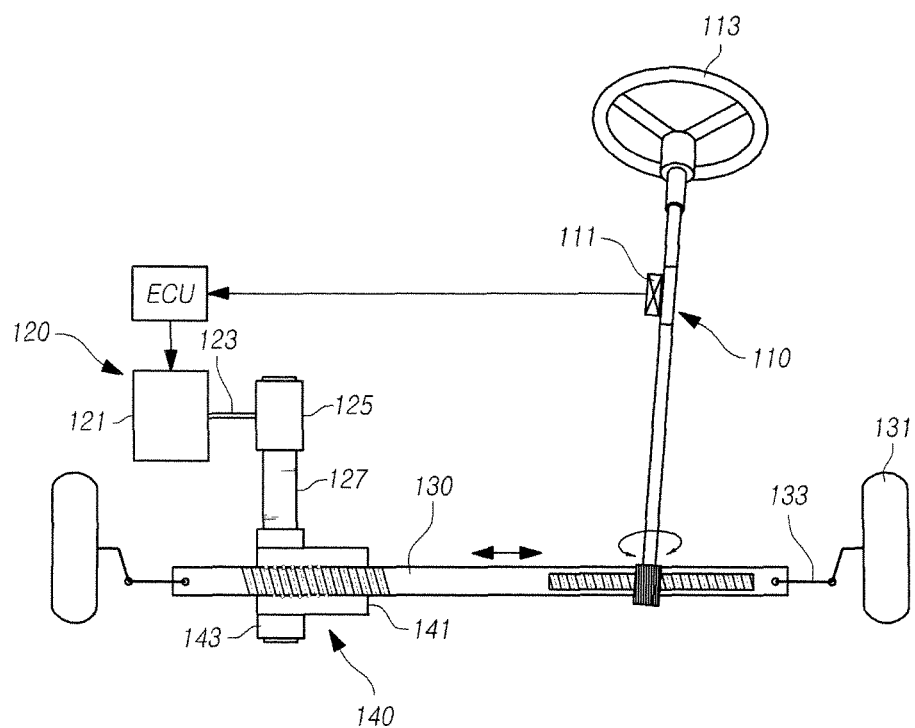
FIG. 1 is a schematic diagram of a rack-driven power steering apparatus according to the related art.
Figure 2:
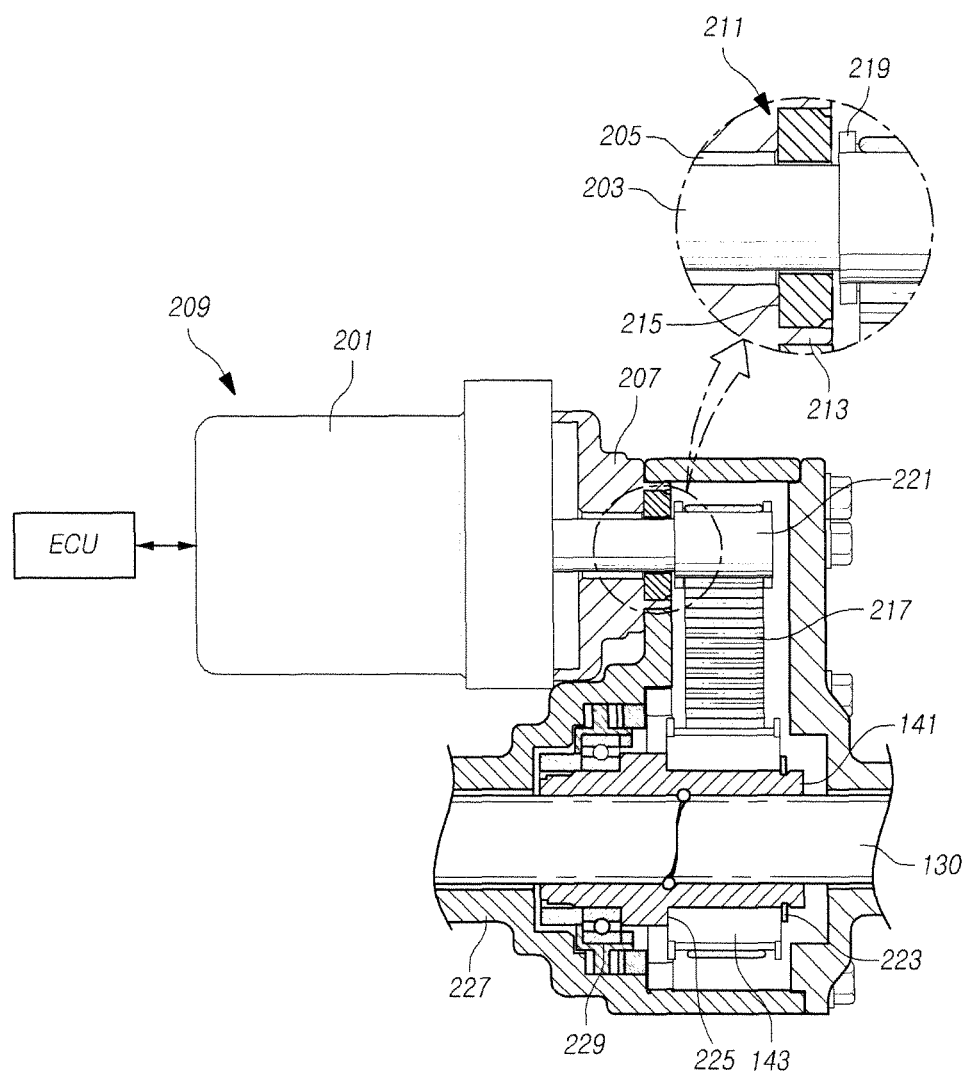
FIG. 2 is a partially sectional view of a part of an electric power steering apparatus including an electric motor according to an embodiment of the present invention.
Figure 3:
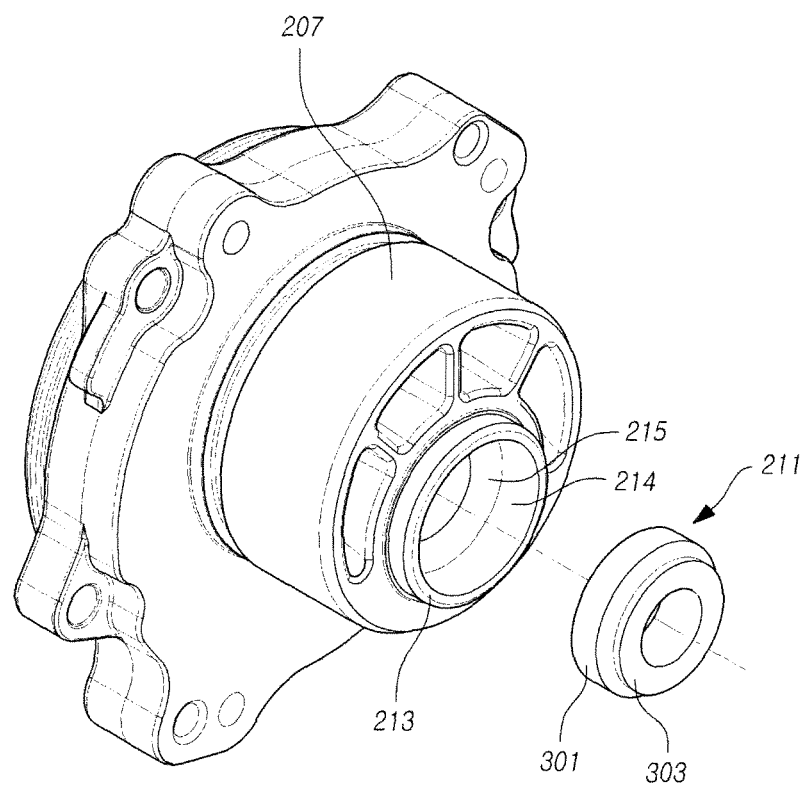
FIG. 3 is an exploded perspective view of a part of FIG. 2.
Figure 4:
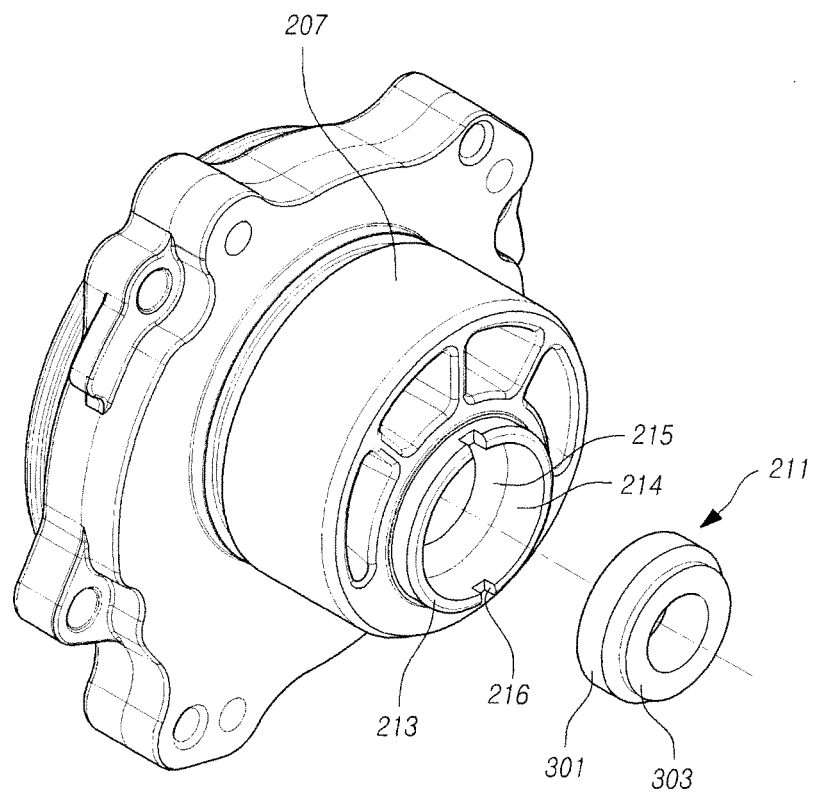
FIG. 4 is an exploded perspective view illustrating another embodiment of the present invention.

FIG. 2 is a partial sectional view of a part of an electric power steering apparatus including an electric motor according to an embodiment of the present invention. FIG. 3 is an exploded perspective view of a part of FIG. 2. FIG. 4 is an exploded perspective view illustrating another embodiment of the present invention.

As illustrated in the drawings, the electric motor 209 according to the embodiment of the present invention includes: a flange 207 coupled to a housing 201 and having a hole 205 through which a driving shaft 203 passes; and a sealing member 211 of which an outer peripheral surface is attached to and supported by an inner peripheral surface of the hole 205 such that a space between the driving shaft 203 and the hole 205 is blocked and through which the driving shaft 203 passes.

The housing 201 functions as a case that surrounds a rotor and a stator provided in the interior thereof, and the flange 207 is coupled to one side of the housing 201.

Meanwhile, the flange 207 has the hole 205 through which the driving shaft 203 passes, and the inner diameter of the hole 205 formed in the flange 207 is larger than the outer diameter of the driving shaft 203.

A rib 213 further protruding in an axial direction of the flange 207 is formed around the hole 205 of the flange 207, and because the rib 213 is formed in the flange 207, the sealing member 211 coupled to the hole 205 of the flange 207, which will be described below, can be stably supported and coupled.

Here, although the rib 213 formed in the flange 207 may have a continuously protruding structure that surrounds a periphery of the hole 205 as illustrated in FIG. 3, it may also have a structure having several cutaway recesses 216 spaced apart from each other in a circumferential direction of the rib 213, and if the cutaway recesses 216 are formed in the rib 213, the sealing member 211 can be easily separated by extracting the sealing member 211 through the cutaway recesses 216 while gripping the sealing member 211 with a tool.

A stepped portion 215 protruding radially inwards are formed on an inner peripheral surface of the flange 207 to support one side of the sealing member 211, and because the stepped portion 215 is formed on the inner peripheral surface of the flange 207, the sealing member 211 coupled to the hole 205 of the flange 207 can not only be stably supported axially, but can also be prevented from being excessively introduced when the sealing member 211 is inserted into the hole 205.

Thereafter, the sealing member 211 is coupled to the hole 205 of the flange 207, that is, the sealing member 211 is provided such that the outer peripheral surface thereof is attached to and supported by the inner peripheral surface of the hole 205 and the driving shaft 203 passes through the sealing member 211, so that the sealing member 211 blocks a space between the driving shaft 203 and the hole 205.

Here, a gap between the outer diameter of the driving shaft 203 and the inner diameter of the sealing member 211 is extremely small, and because the sealing member 211 is coupled to the hole 205 of the flange 207, penetration of foreign substances into the electric motor 209 through the space between the hole 205 of the flange 207 and the driving shaft 203 can be prevented.

That is, as described above, for example, although an electric motor provided in a rack-driven power steering apparatus has problems in that foreign substances are introduced between a housing and a shaft so that the electric motor may malfunction, a component of the electric motor may be damaged, and an output of the electric motor may be lowered, penetration of foreign substances into the electric motor 209 through the space between the hole 205 of the flange 207 and the driving shaft 203 can be prevented by applying the electric motor 209 according to the embodiment of the present invention to a rack-driven power steering apparatus, so that a problem of the electric motor of the rack-driven power steering apparatus according to the related art can be solved.

Of course, the sealing member 211 may include a larger diameter portion 301 attached to the inner peripheral surface of the hole 205 and a small diameter portion 303 extending from the large diameter portion 301 to the axially outer side of the hole 205, and because the small diameter portion 303 is formed in the sealing member 211, the sealing member 211 can be easily separated.

That is, when the operator intends to extract the sealing member 211 from the hole 205 of the flange 207, he or she has to extract the sealing member 211 by pulling the sealing member 211 to the axially outside of the hole 205 while gripping the small diameter portion 303 using a tool, so that an operation of separating the sealing member 211 from the hole 205 to replace the sealing member 211 can be easily performed.

Of course, friction between the outer peripheral surface of the driving shaft 203 and the inner peripheral surface of the sealing member 211 can be reduced by further forming a coating layer 214 formed of a friction reducing material on the inner peripheral surface of the sealing member 211.

Meanwhile, an electric power steering apparatus according to another embodiment of the present invention includes: the above-described electric motor 209; and a pulley 221 having protrusion supports 219 protruding to the radially outer sides at opposite ends thereof to support opposite sides of a driving belt 217.

Here, because an example of the electric motor 209 included in the electric power steering apparatus according to the another embodiment of the present invention has been described above, a detailed description thereof will be omitted.

The pulley 221 is coupled to the driving shaft 203 of the electric motor 209, and the protrusion supports 219 protruding to the radially outsides are formed at opposite ends of the pulley 221. The protrusion supports 219 are provided to support opposite sides of the driving belt 217 coupled to the pulley 221.

That is, the driving belt 217 connects the pulley 221 coupled to the driving shaft 203 and the driven pulley 143 coupled to the ball nut 141 to transmit a driving force of the electric motor 209 to the ball nut 141, and because the protrusion supports 219 are formed at opposite sides of the pulley 221, the driving belt 217 can be prevented from being pushed out to the opposite sides of the pulley 221 when the pulley 221 is rotated.

The ball nut 141 is coupled to the rack bar 130 by a medium of balls and the driving force of the electric motor transmitted through the driving belt 217 rotates the ball nut 141, and accordingly, the rack bar 130 coupled to the ball nut 141 by a medium of balls are moved leftwards and rightwards to assist a steering force of the driver.

One side of the driven pulley 143 coupled to the ball nut 141 by a fixing member 223 mounted on and fixed to the outer peripheral surface of the ball nut 141, and an opposite side of the driven pulley 143 is supported by a support step 225 formed on the outer peripheral surface of the ball nut 141.

The ball nut 141 is rotatably supported by a bearing member 229 provided in the interior of the rack housing 227.

As described above, according to exemplary embodiments of the present invention, problems such as a malfunction of an electric motor, damage to a component of the electric motor, and lowering of an output of the electric motor can be solved by preventing penetration of foreign substances into the electric motor, so that a steering stability of a vehicle can be improved.

Even if it was described above that all of the components of an embodiment of the present invention are coupled as a single unit or coupled to be operated as a single unit, the present invention is not necessarily limited to such an embodiment. The scope of the present invention shall be construed on the basis of the accompanying claims in such a manner that all of the technical ideas included within the scope equivalent to the claims belong to the present invention.

What is claimed is:

1. An electric motor comprising:
    a flange coupled to a housing and having a hole, through which a driving shaft of the electric motor passes;
    a sealing member of which an outer peripheral surface is attached to and supported by the hole and through which the driving shaft passes, such that a space between the driving shaft and the hole is blocked; and
    a rib formed around the hole of the flange and protruding in an axial direction of the flange,
    wherein the rib has a plurality of cutaway recesses grooved in the axial direction and spaced apart from each other in a circumferential direction.

2. The electric motor of claim 1, wherein a stepped portion protruding to an radially inner side is formed on an inner peripheral surface of the flange to support one side of the sealing member.

3. The electric motor of claim 1, wherein the sealing member includes a large diameter portion attached to an inner peripheral surface of the hole, and a small diameter portion extending from the large diameter portion to an axially outer side of the hole.

4. The electric motor of claim 3, wherein a coating layer of a friction reducing material is formed on an inner peripheral surface of the sealing member.

5. An electric power steering apparatus comprising:
    the electric motor of claim 1; and
    a pulley coupled to the driving shaft and having protrusion supports protruding to radially outer sides at opposite ends thereof to support opposite ends of a driving belt.

6. The electric power steering apparatus of claim 5, wherein a stepped portion protruding to an radially inner side is formed on an inner peripheral surface of the flange to support one side of the sealing member.

7. The electric power steering apparatus of claim 5, wherein the sealing member includes a large diameter portion attached to an inner peripheral surface of the hole, and a small diameter portion extending from the large diameter portion to an axially outer side of the hole.

8. The electric power steering apparatus of claim 7, wherein a coating layer of a friction reducing material is formed on an inner peripheral surface of the sealing member.

* * * * *